US007853483B2

(12) United States Patent
Patten et al.

(10) Patent No.: US 7,853,483 B2
(45) Date of Patent: Dec. 14, 2010

(54) MEDIUM AND SYSTEM FOR ENABLING CONTENT SHARING AMONG PARTICIPANTS ASSOCIATED WITH AN EVENT

(75) Inventors: Michael J. Patten, Sammamish, WA (US); Ian Cameron Mercer, Sammamish, WA (US)

(73) Assignee: Microsoft Coporation, Redmond, WA (US)

( * ) Notice: Subject to any disclaimer, the term of this patent is extended or adjusted under 35 U.S.C. 154(b) by 1316 days.

(21) Appl. No.: 11/198,138

(22) Filed: Aug. 5, 2005

(65) Prior Publication Data

US 2007/0033109 A1    Feb. 8, 2007

(51) Int. Cl.
    *G06Q 30/00*    (2006.01)
(52) U.S. Cl. ...................................................... 705/26
(58) Field of Classification Search ................. 705/26, 705/27; 707/737
    See application file for complete search history.

(56) References Cited

U.S. PATENT DOCUMENTS

| | | | |
|---|---|---|---|
| 6,697,824 B1 | 2/2004 | Bowman-Amuah | |
| 7,062,532 B1* | 6/2006 | Sweat et al. | 709/205 |
| 2001/0016851 A1 | 8/2001 | Gramsamer et al. | |
| 2002/0023132 A1* | 2/2002 | Tornabene et al. | 709/205 |
| 2003/0021591 A1* | 1/2003 | Grosvenor et al. | 386/124 |
| 2003/0028585 A1 | 2/2003 | Yeager et al. | |
| 2003/0055896 A1 | 3/2003 | Hu et al. | |
| 2003/0131002 A1* | 7/2003 | Gennetten et al. | 707/10 |
| 2003/0236831 A1 | 12/2003 | Ortiz et al. | |
| 2003/0236832 A1* | 12/2003 | McIntyre et al. | 709/204 |
| 2004/0002920 A1 | 1/2004 | Prohel et al. | |
| 2004/0034653 A1 | 2/2004 | Maynor et al. | |
| 2004/0070678 A1* | 4/2004 | Toyama et al. | 348/231.3 |
| 2004/0093323 A1* | 5/2004 | Bluhm et al. | 707/3 |
| 2004/0111415 A1 | 6/2004 | Scardino et al. | |
| 2004/0143451 A1 | 7/2004 | McIntyre et al. | |
| 2004/0221053 A1 | 11/2004 | Codella et al. | |
| 2005/0038876 A1 | 2/2005 | Chaudhuri | |
| 2005/0150944 A1 | 7/2005 | Melick et al. | |
| 2005/0235062 A1* | 10/2005 | Lunt et al. | 709/225 |
| 2005/0256866 A1* | 11/2005 | Lu et al. | 707/5 |
| 2006/0044407 A1 | 3/2006 | Barbeau | |
| 2006/0053195 A1* | 3/2006 | Schneider et al. | 709/204 |

(Continued)

FOREIGN PATENT DOCUMENTS

WO    WO 03/071420 A2    8/2003

OTHER PUBLICATIONS

Nance, Barry "A Grand Opening for Virtual Storefronts With Middleware" Network Computing , Jun. 1, 1997, p. 80.*

(Continued)

*Primary Examiner*—Yogesh C Garg
*Assistant Examiner*—Matthew Zimmerman
(74) *Attorney, Agent, or Firm*—Senniger Powers LLP

(57) ABSTRACT

Enabling the automatic identification of participants to a common event to enable data sharing between the participants. An event identifier embedded in the content data associates the content data with an event. A content data service maintains a list of event identifiers and a list of participants associated with each event. Each of the participants communicates with the content data service to identify the other participants. The participants communicate with each other to share content data from the common event.

18 Claims, 7 Drawing Sheets

U.S. PATENT DOCUMENTS

2006/0104600 A1* 5/2006 Abrams .................. 386/46
2006/0216021 A1* 9/2006 Touchard et al. ............ 396/429
2007/0008321 A1* 1/2007 Gallagher et al. ........... 345/473

OTHER PUBLICATIONS

Unknown, "Social Computing Group," printed from http://research.microsoft.com/scg, 2003, 14 pages, Microsoft Corporation, U.S.A.

Unknown, "Hello: Welcome," printed on Aug. 5, 2005, printed from http://www.hello.com/, Google, Inc., 2005, 1 page, U.S.A.

Ludington, "PiXPO Review," Infopackets Windows Newsletter, Aug. 9, 2004, 4 pages, Computer 411 Infopackets.com, U.S.A.

Unknown, "Use PBase to Host and Share Your Photos," printed on Aug. 5, 2005, printed from http://www.pbase.com/?welcome=0002, 1999-2005, 3 pages, pbase.com LLC, U.S.A.

Unknown, "What is Flickr?," printed on Aug. 5, 2005, printed from http://flickr.com/learn_more.gne, Yahoo! Inc., 1 page, U.S.A.

Unknown, "OurPictures," printed from http://ourpictures.com, 2004-2005, 6 pages, OurPictures, Inc., U.S.A.

Unknown, "Semacode, the In-Depth Technical Version," printed from http://semacode.org, 2002-2005, 11 pages, Semacode Corporation, U.S.A.

* cited by examiner

MEDIUM AND SYSTEM FOR ENABLING CONTENT SHARING AMONG PARTICIPANTS ASSOCIATED WITH AN EVENT

BACKGROUND

Systems for sharing photographs are known in the art. Typical systems enable the sharing of photographs to individuals known to the photographer (e.g., friends and family). Such systems require the photographer to manually identify each of the individuals with whom to share the photographs. The photographs may be mailed (electronically or via postal mail) to the individuals or posted on a web site accessible by the individuals. These individuals are known to the photographer and identified by the photographer as possibly having an interest in the photographs.

Other typical systems provide a plurality of users with a unique user identifier associated with a network address where photographs of common interest to the users are stored. Each of the users has a separate password to access the network address and view the stored images. Such systems, however, require the user to identify the photographs to be associated with the unique user identifier.

SUMMARY

Embodiments of the invention permit the sharing of content data via an opt-in trust relationship. In an embodiment, the invention enables participants attending common events to discover one another and share content data such as photos and videos (e.g., after the event). A content data service maintains a list of event identifiers each corresponding to an event to which the content data may be associated. The content data has an event identifier embedded therein to allow the content data to be associated with the event. The content data is stored in a shared space accessible by the participants. The content data service maintains a list of the participants for each of the event identifiers and a trust profile for each of the participants for each of the event identifiers. The trust profile enables users to selectively authorize access to the content data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
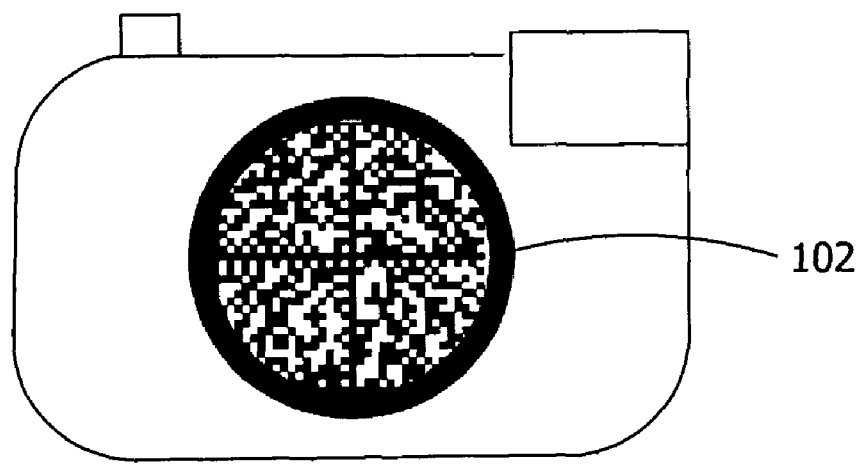
FIG. 1 is an exemplary embodiment of an event identifier.

In an embodiment, the invention permits the creation of trust relationships by allowing attendees, participants, or other users to opt-in to a content sharing relationship based on a common event or location. An event identifier is embedded within the content data from the event. For example, a bar code 102 such as shown in FIG. 1, a serial number, a network address (e.g., a uniform resource locator), or another readily photographed code is displayed at the event for photographing by attendees of the event. The event identifier allows each attendee to associate content data with the event without having to remember a network address. Content data includes, for example, audio, video, still images, and other data. The other data may include a list of attendees or a schedule. With aspects of the invention, attendees are not limited to sending the content data to other attendees via electronic mail or uploading the content data to a group memory area (e.g., a web site). Further, attendees control the content data to be shared with other attendees at the event. With embodiments of the invention, content data is automatically categorized and updated with metadata about the event. The peer-to-peer networking aspect of embodiments of the invention enable the exchange of high-quality content data (e.g., as opposed to low resolution photographs sent via electronic mail).

Figure 2:
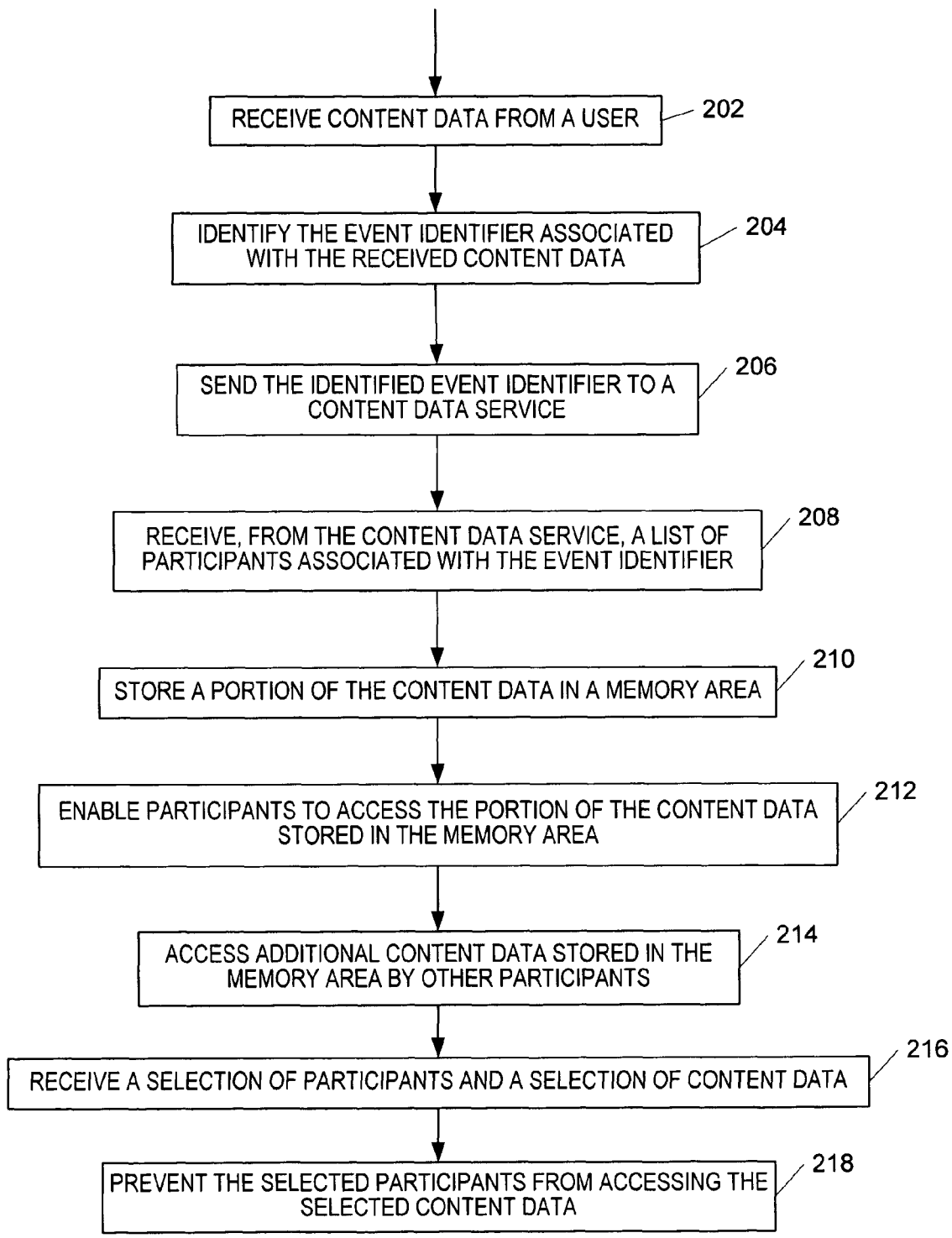
FIG. 2 is an exemplary flow chart illustrating operation of a user computing device.

Referring next to FIG. 2, a flow chart illustrates operation of a computing device associated with an attendee, participant, or other user. The computing device may be any device executing computer-executable instructions including, but not limited to, a personal computer, a personal digital assistant, a portable media player, and a wireless device (e.g., a telephone). The computing device receives content data from a user at 202. The content data has an event identifier embedded therein. In an audio or video embodiment, the audio track may be "fingerprinted" as known in the art to include forensic information such that the date, time, and location of the recording of the audio track may be identified from the fingerprint.

The computing device identifies the event identifier associated with the received content data at 204 and sends the identified event identifier to a content data service at 206. The computing device receives, from the content data service, a list of participants associated with the identified event identifier at 208. The computing device stores at least a portion of the content data in a memory area (e.g., a shared space) at 210 and enables at least one of the participants to access the portion of the content data stored in the memory area at 212. The user accesses additional content data stored in the memory area by other participants at 214. The additional content data is associated with the identified event identifier.

In one embodiment, one or more computer-readable media have computer-executable instructions for performing the computerized method illustrated in FIG. 2.

The computing device may also implement blocking. For example, the computing device may receive a selection of one or more of the participants and a selection of the content data from the user at 216. The computing device is able to prevent the selected participants from accessing the selected content data in the memory area at 218. In one embodiment, the computing device (or the content data service) maintains an access control list to control access to the content data stored in the memory area.

The method illustrated in FIG. 2 is illustrated in further detail with reference to FIG. 3, FIG. 4, and FIG. 5.

Figure 3:
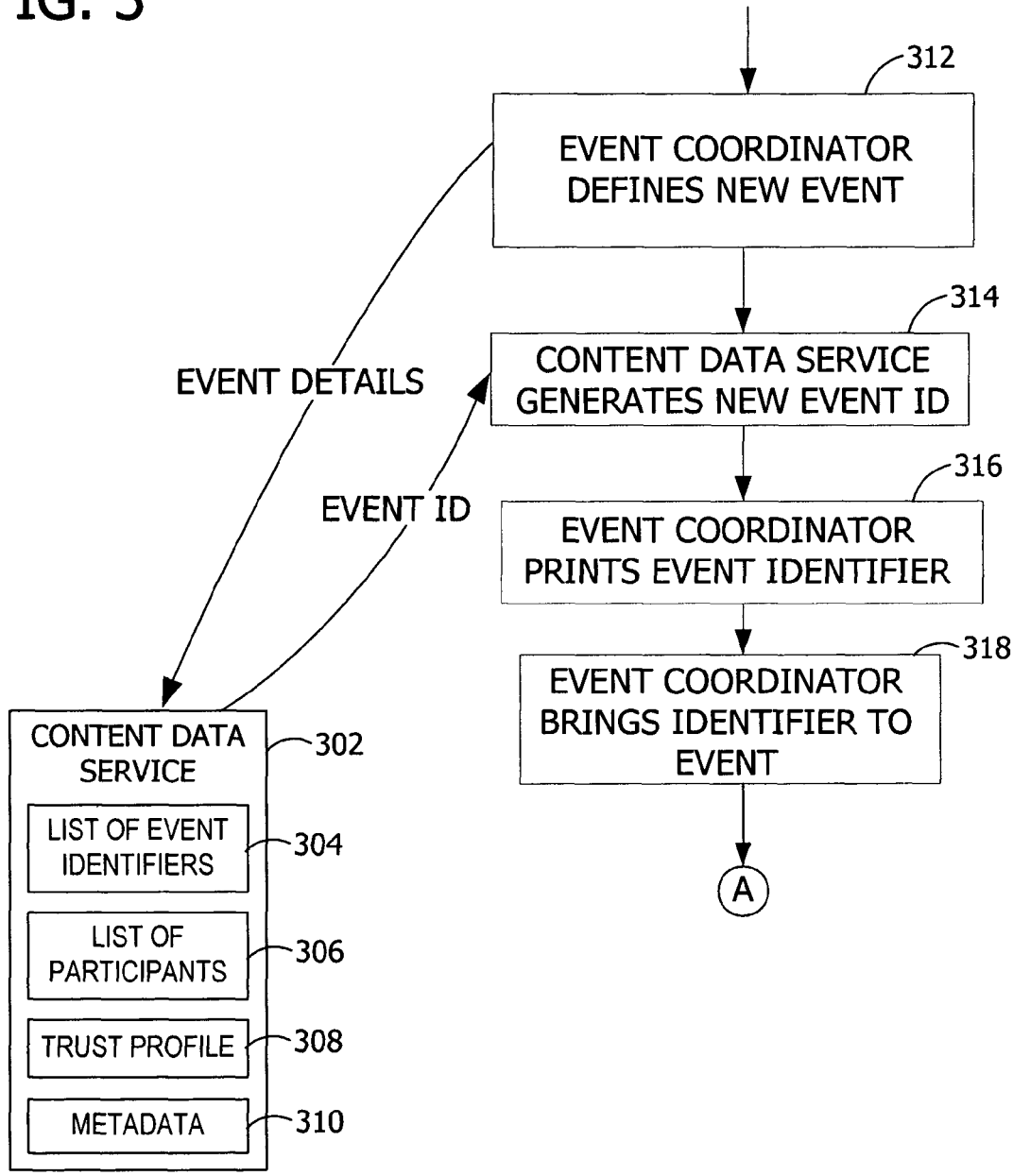
FIG. 3 is an exemplary block diagram illustrating event registration.

Referring next to FIG. 3, an exemplary block diagram illustrates event registration. The content data service 302 illustrated in FIG. 3 stores a list of event identifiers 304, a list of participants 306, a trust profile 308, and metadata 310 associated with event. Each of the event identifiers 304 corresponds to an event with which content data (e.g., metadata 310) is associated. Each list of participants 306 is associated with one of the event identifiers 304. The content data service 302 maintains the trust profile 308 for each of the participants 306 for each of the event identifiers 304. Participants 306 access the content data as a function of the trust profile 308. The content data service 302 also stores metadata associated with each event.

Prior to an event, the event coordinator goes online to a web site of the content data service 302 to define and establish a new event at 312. The event may include, but is not limited to, one or more of the following: a sporting event, a school play, a concert, a speech, a holiday gathering, and a backyard barbeque. The event coordinator enters information about the event including event details such as an event name, a date, an event duration, and a description of the event. This information will be associated automatically with content data obtained during the event, as described herein.

After the event coordinator defines the event, the content data service 302 generates an event identifier for the defined event at 314. The content data service 302 issues, to the event coordinator, the event identifier (e.g., a bar code) unique among other issued event identifiers 304. The event coordinator prints out the issued event identifier (e.g., prints the bar code) at 316. Participants use the event identifier to identify the event and opt-in to the trust relationship. The event coordinator brings the event identifier to the event at 318 and makes it available for participants to see and photograph or otherwise embed within content data obtained during the event. Aspects of the invention are operable with any opt-in means known in the art.

The event coordinator may choose to print out a single event identifier to take to the event or may also print out handouts that contain the event identifier printed thereon. The handouts allow users to opt-in during or after the event. The event identifiers may also be printed on program brochures (e.g., at a school play), cards, or other materials that are made available at events.

Figure 4:
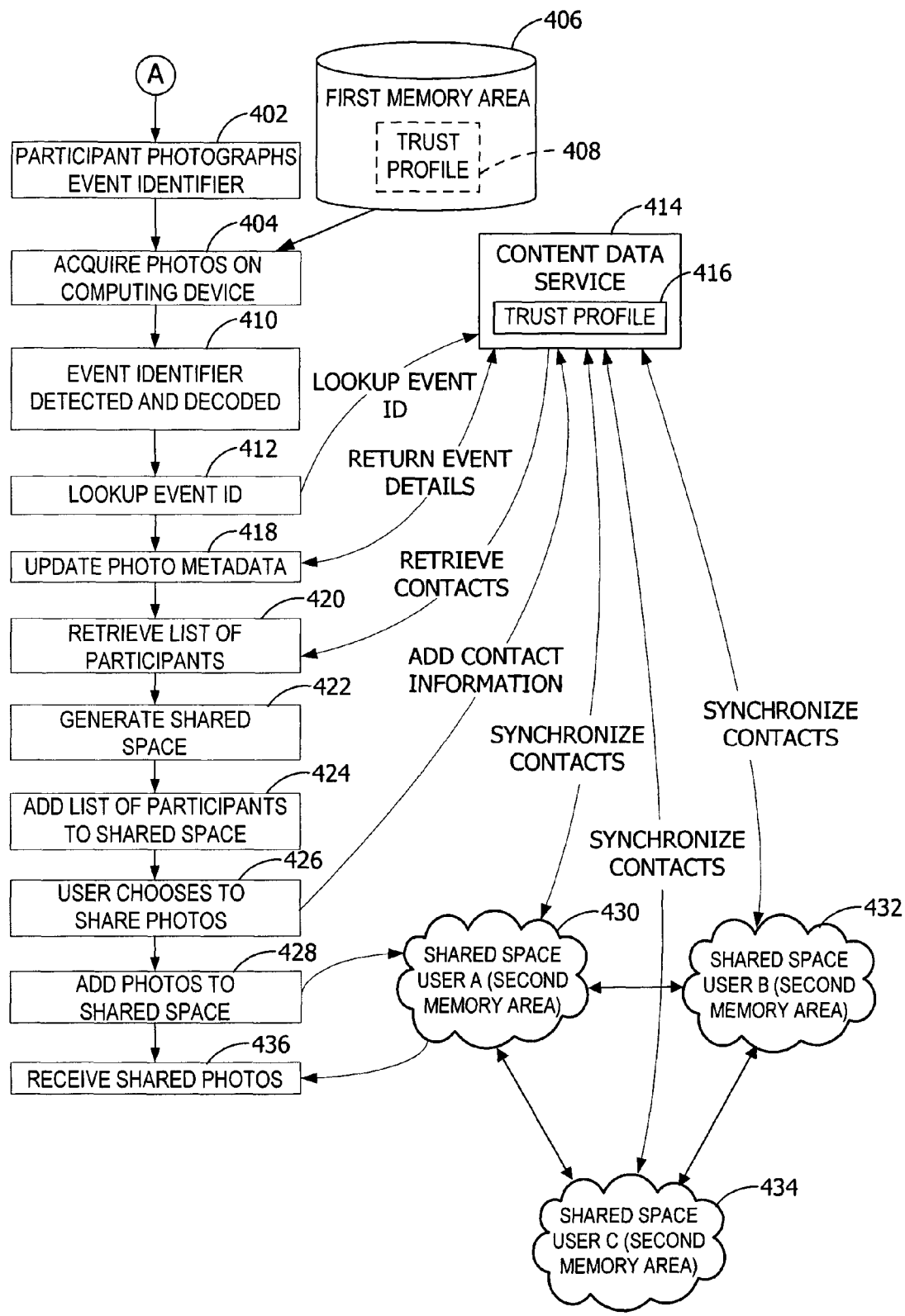
FIG. 4 is an exemplary block diagram illustrating the association of content data with an event identifier.

Referring next to FIG. 4, an exemplary block diagram illustrates the association of content data with an event identifier. At an event, participants who want to share their content data may photograph at 402 or otherwise acquire the event identifier associated with the event. By doing so, the participants choose to opt-into a trust relationship with other participants at the event. The photograph of the event identifier is used to associate the content data with the event. The participants photograph the event identifier before, during, or after the event. After the participants attend the event and return to a computing device, the participants transfer the content data (e.g., photographs, video, audio, etc.) to the computing device from a first memory area 406 to acquire the content data on the computer device at 404. The first memory area 406 may comprise, for example, a digital camera. Computer-executable instructions associated with the computing device detect, decode, or otherwise recognize the event identifier embedded within the transferred content data at 410. The computing device determines which portions of the content data are to be associated with the event identifier. In the example of photographs, the computing device may compute a color histogram of each photograph (including the photograph with the event identifier) to determine which photographs should be associated with the event identifier. The content data service 414 looks up the event identifier with the content data service 414 at 412. The content data service 414 returns, to the computing device, metadata (e.g., event details) associated with the event based on the event identifier.

In an alternative embodiment of the invention, the computing device determines which portions of the content data are to be associated with the event identifier by comparing a date, time, and duration of the event along with the timestamp of each element of the content data (e.g., each photograph).

The computing device updates the content data determined to be associated with the event identifier with the event identifier and with the metadata from the content data service 414 at 418. The content data is automatically categorized based on the event identifier to provide an improved media library experience for the user of the computing device.

Responsive to sending the event identifier to the content data service 414, the computing device receives a list of participants (e.g., contacts) associated with the event identifier at 420. The list of participants may be embodied in a trust profile 408, 416. The list of participants may include, in one embodiment, a feedback rating associated with each of the participants. Each participant may use such a feedback rating to determine if a participant should be excluded from accessing content data via the trust profile 408, 416. In one embodiment, the first memory area 406 storing the content data also stores the trust profile 408 associated with the event. In another embodiment, the content data service 414 maintains the trust profile 416 for each event. The trust profile 408, 416 may also identify particular portions of the content data accessible to each of the participants. Via the trust profile 408, 416, participants manage trust relationships and filter incoming content data.

The computing device creates or generates a shared space or other memory area (e.g., a second memory area) for access by the participants on the list of participants at 422. In one embodiment, there is a shared space for each participant for each event identifier such as shared space user A 430, shared space user B 432, and shared space user C 434. The shared spaces 430, 432, 434 communicate with the content data service 414 to synchronize the list of participants (e.g., contacts). In one embodiment, each shared space 430, 432, 434 resides on the computing device as a folder on a hard drive. In another embodiment, one or more of the shared spaces 430, 432, 434 are located on a central server (e.g., associated with the content data service 414).

The computing device adds the participants to the shared space such as shared space A 430 at 424 to enable access, by the participants, to the second memory area. When a participant decides to share content data (e.g., photographs) at 426, the participant identifies at least a portion of the content data to add to the shared space A 430. The participant may identify some or all of the content data stored in the first memory area 406 to be transferred to the second memory area. The participant then adds the identified content data to the shared space A 430 at 428. Depending on the amount of content data and the bandwidth of the connection between the computing device and the shared space A 430, the selected content data may take hours or days to transfer. The participant also provides contact information to the content data service 414 to update the list of participants maintained by the content data service 414. The participants receive content data (e.g., shared photographs from the same event) from the shared space A 430 at 436. Participants who have chosen to opt-in are automatically notified of new content data that has been delivered to the shared space A 430 from other participants.

In one embodiment, the computing device accesses the content data from other participants independent of the content data service 414 such as in a peer-to-peer network. In this manner, the content data service 414 does not need to store large amounts of content data nor act as an intermediary between the participants when sharing the content data.

Figure 5:
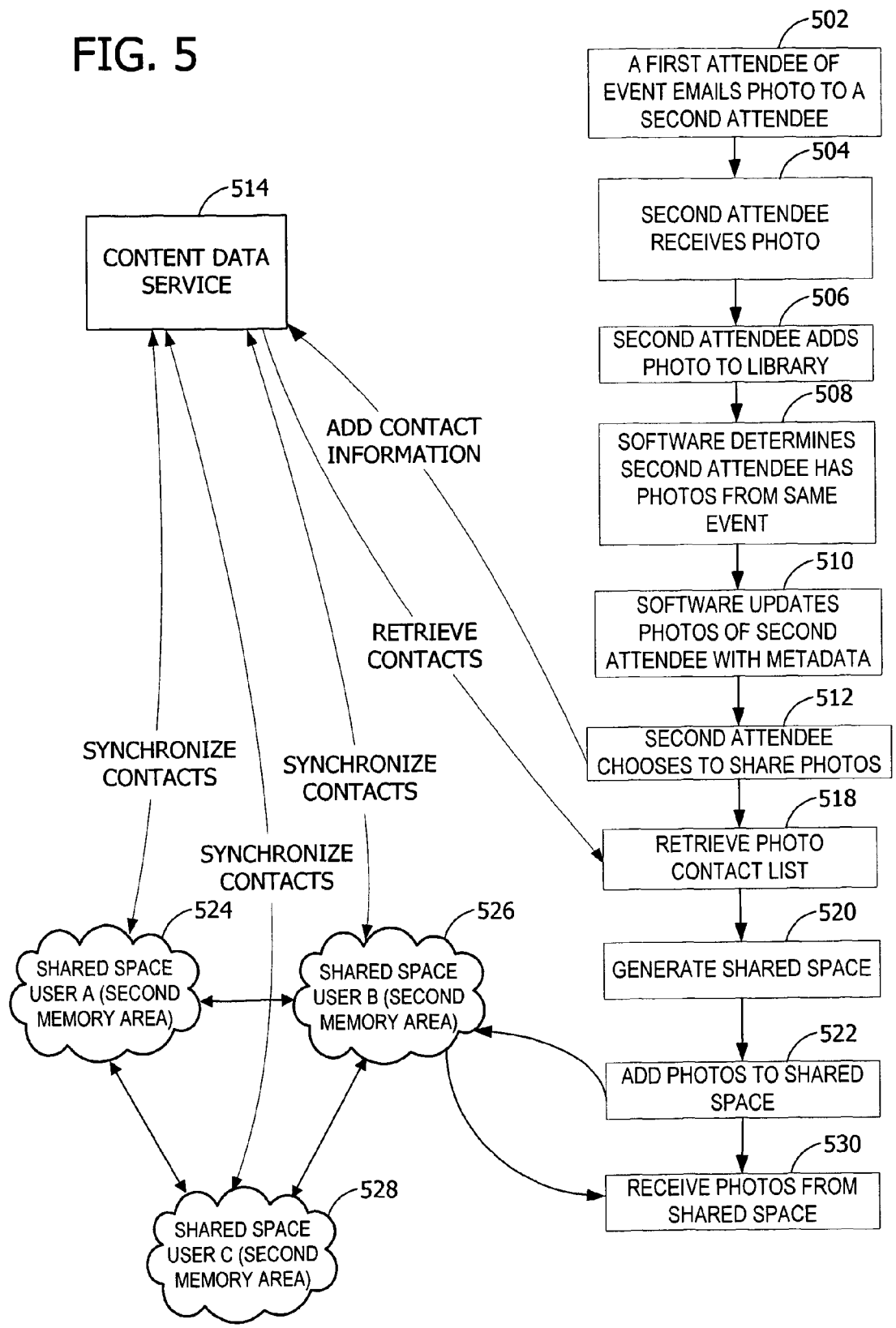
FIG. 5 is an exemplary block diagram illustrating receipt by a participant of content data from another participant.

Referring next to FIG. 5, an exemplary block diagram illustrates receipt by a participant of content data from another participant. In FIG. 5, a first attendee emails additional content data (e.g., a photograph) to a second attendee at 502. In this example, the second attendee does not have an event identifier associated with content data stored by the second attendee. The second attendee receives the additional content data at 504 and adds the additional content data to a media library associated with the second attendee at 506. Aspects of the invention determine whether the additional content data is related to existing content data stored by the second attendee at 508. Such a determination may occur by comparing a timestamp of the additional content data with the existing content data, by computing and comparing histograms or other image characteristics of the additional content data and the existing content data, and by means known in the art. If a determination is made that the additional content data is related to existing content data, the existing content data is updated with metadata (e.g., event details) associated with the additional content data at 510.

If the second attendee chooses to share existing content data at 512, the second attendee provides contact information to the content data service 514 to become a participant. The second attendee receives a list of participants (e.g., contacts) associated with the event associated with the content data at 518. The second attendee generates a shared space at 520, adds the content data (e.g., photographs) to the shared space at 522, and receives content data from the shared space at 530. In one embodiment, there is a shared space for each participant for each event identifier such as shared space user A 524, shared space user B 526, and shared space user C 528. The shared spaces 524, 526, and 528 communicate with the content data service 514 to synchronize the list of participants (e.g., contacts).

In one embodiment, aspects of the invention may prompt: "This content is part of an event, do you want to create a new folder and get content associated with this event from other people who were also attended the event?" In an alternative embodiment, the computing device may prompt "I see you have content in your library that was captured at the same time as the event to which this content belongs. Do you want to share some of this content with other people who also attended the event?"

In yet another embodiment, the second attendee may choose to add the first attendee to a trusted friends list. If added, future content data from the first attendee is automatically downloaded from the shared space (e.g., shared space A 524) and added to the media library of the second attendee.

Figure 6:
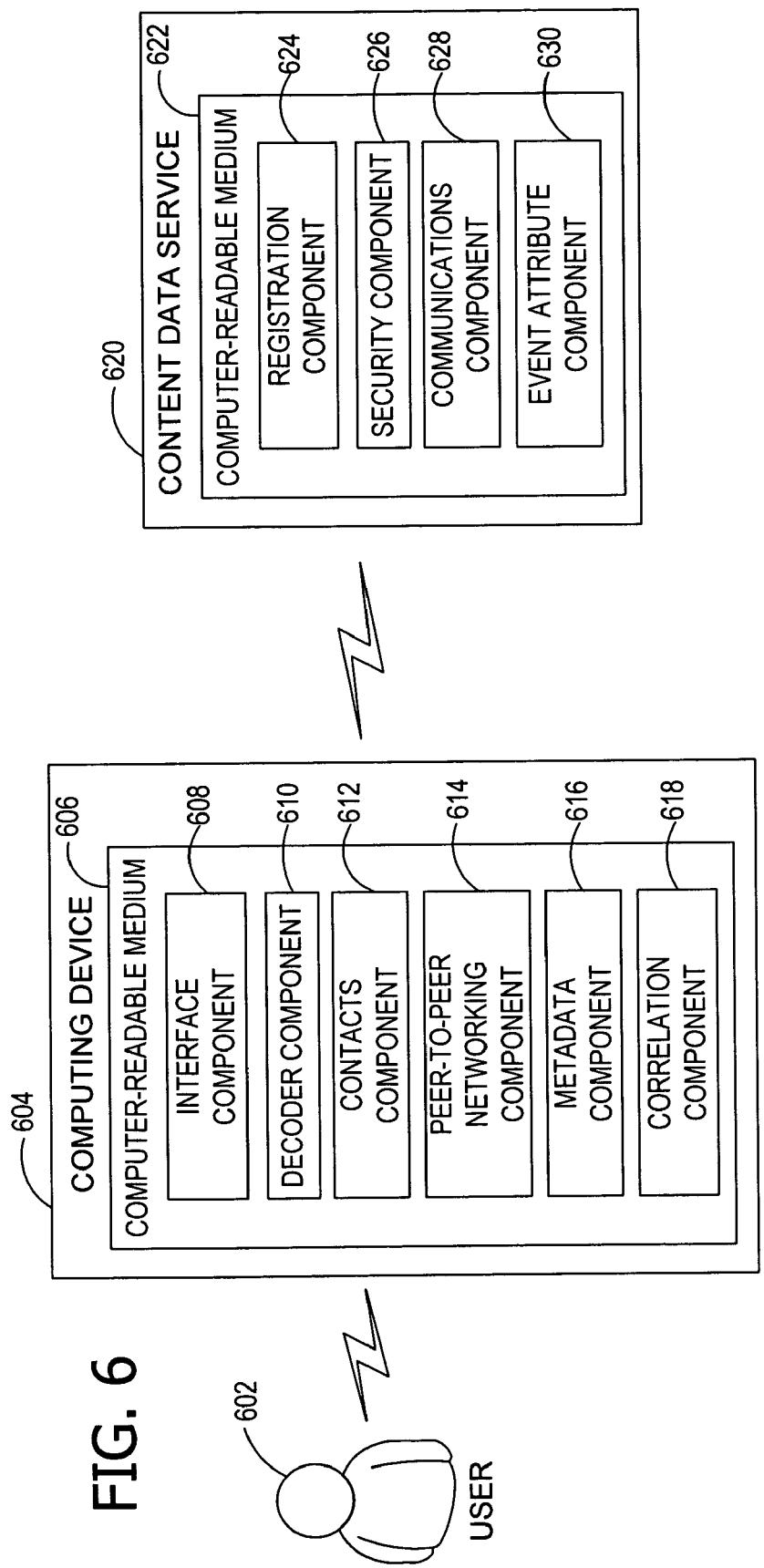
FIG. 6 is a block diagram of an exemplary operating environment in one aspect of the invention.

Referring next to FIG. 6, a block diagram illustrates an exemplary operating environment. In the example of FIG. 6, a user 602 communicates with a computing device 604. The computing device 604 has access to one or more computer-readable media such as computer-readable medium 606 having computer-executable components for associating content data with an event. Exemplary components include an interface component 608, a decoder component 610, a contacts component 612, a peer-to-peer networking component 614, a metadata component 616, and a correlation component 618. The interface component 608 receives content data from the user 602. The content data has an event identifier embedded therein. The decoder component 610 detects the event identifier. The contacts component 612 sends the identified event identifier to a content data service 620 and receives, from the content data service 620, a list of participants associated with the identified event identifier. The peer-to-peer networking component 614 generates a shared space for access by at least one of the participants, adds the list of participants to the shared space, adds at least a portion of the content data to the shared space, and receives additional content data from the at least one of the participants via the shared space. The additional content data is associated with the event identifier.

The metadata component 616 receives, from the content data service 620, metadata associated with the identified event identifier responsive to sending the identified event identifier and associates the received metadata with the received content data. The correlation component 618 receives additional content data from another user, determines if the received additional content data is related to the content data, and updates the received additional content data with the metadata associated with the content data.

The content data service 620 has access to one or more computer-readable media such as computer-readable medium 622 having computer-executable components for enabling the sharing of data content associated with an event. Exemplary components include a registration component 624, a security component 626, a communications component 628, and an event attribute component 630. The registration component 624 maintains a list of event identifiers each corresponding to an event to which content data is associated. The content data has the corresponding event identifier embedded therein. The security component 626 maintains a list of participants associated with each of the event identifiers and maintains a trust profile for each of the participants for each of the event identifiers. At least a portion of the participants provide the content data and the participants access the content data as a function of the trust profile. The communications component 628 transmits the list of participants to each of the participants. The event attribute component 630 stores metadata associated with each of the event identifiers and provides the stored metadata associated with a particular event identifier to the participants in the list of participants associated with the particular identifier.

The exemplary operating environment illustrated in FIG. 6 includes a general purpose computing device (e.g., computing device 604) such as a computer executing computer-executable instructions. The computing device 604 typically has at least some form of computer readable media (e.g., computer-readable medium 606 or computer-readable medium 622). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. The user 602 may enter commands and information into the computing device through input devices or user interface selection devices such as a keyboard and a pointing device (e.g., a mouse, trackball, pen, or touch pad). Other input devices (not shown) may be connected to the computing device. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 7:
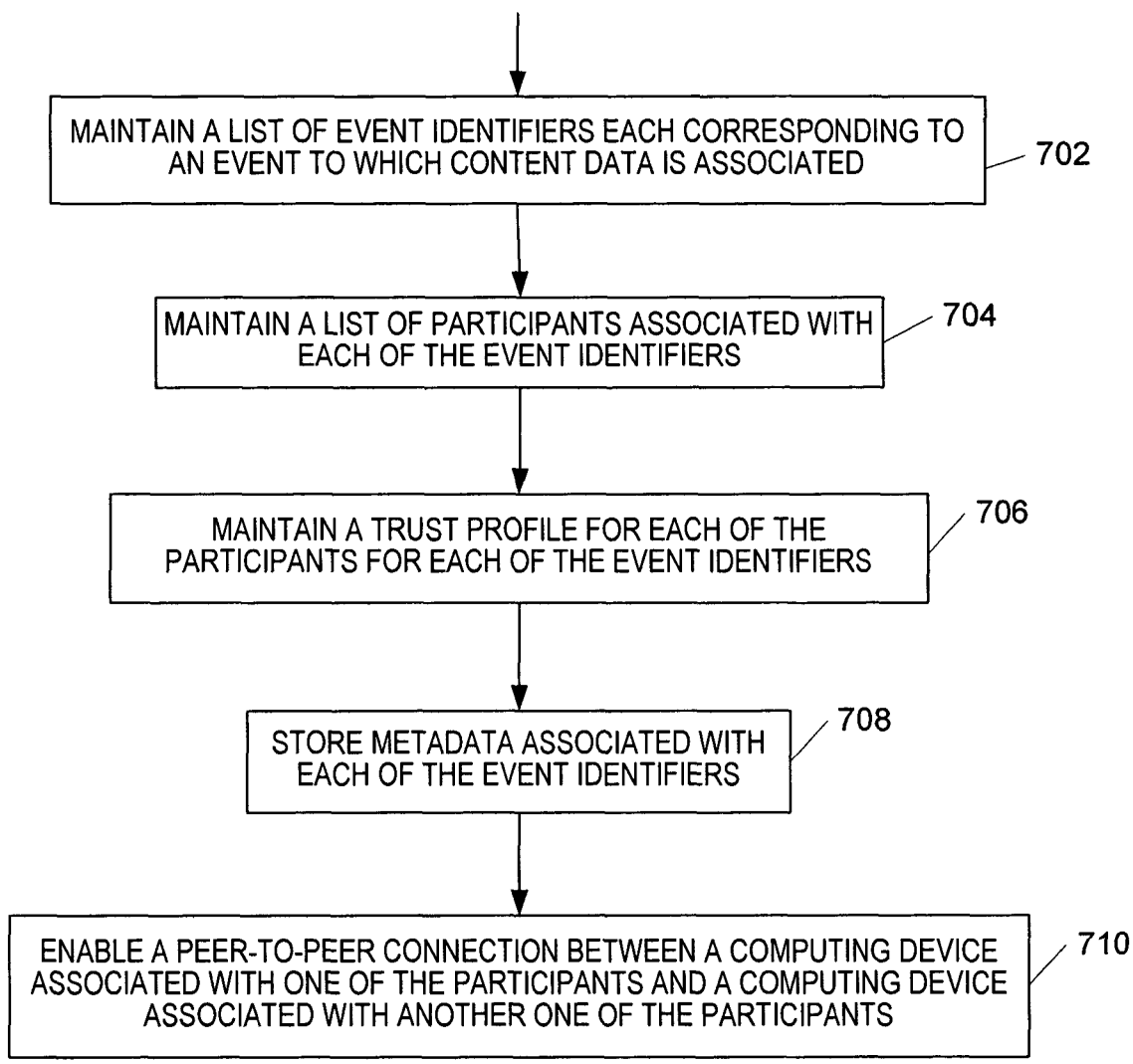
FIG. 7 is an exemplary flow chart illustrating operation of the content data service.

Referring next to FIG. 7, an exemplary flow chart illustrates operation of the content data service. The content data service implements a method of enabling the sharing of content data associated with an event. In the example of FIG. 7, the content data service maintains a list of event identifiers each corresponding to an event to which content data is associated at 702, maintains a list of participants associated with each of the event identifiers at 704, and maintains a trust profile for each of the participants for each of the event identifiers at 706. In general, the participants access the content data as a function of the trust profile. Using the list of participants, participants may create the trust profile and choose to block content from other participants or prevent content from being shared. For example, the trust profile may identify a first participant from the list of participants who is blocked from accessing content data of a second participant. The content data service further stores metadata associated with each of the event identifiers at 708. The content data service interacts with participants to enable a peer-to-peer connection between a computing device associated with one of the participants and a computing device associated with another one of the participants at 710.

In one embodiment, one or more computer-readable media have computer-executable instructions for performing the computerized method illustrated in FIG. 7.

In operation, computer 130 executes computer-executable instructions such as those illustrated in the figures to implement aspects of the invention.

The following examples further illustrate embodiments of the invention. Hardware, software, firmware, computer-executable components, computer-executable instructions, and/or the elements of FIGS. 1-7 constitute means for generating an event identifier responsive to a request from a user, means for maintaining the trust profile, means for storing the event identifier in the content data, means for identifying the event identifier from the content data, and means for sharing content data with the plurality of participants.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for enabling content sharing among participants in an event, said system comprising:
   a one or more memory and a one or more computer processors configured to:
      create a trust profile for each participant in a list of participants;
      receive content data from a first participant of the event, wherein the content data comprises:
         a first data including a digital image of an event identifier captured by the first participant, wherein the event identifier is provided by an event coordinator of the event, and
         a second data including at least one of a digital image, video data, and audio data;
      decode the received content data to detect the event identifier embedded in the digital image of the first data;

analyze the second data to determine which of the at least one digital image, video data, and audio data to associate with the event identifier; and create a filtered data based on the analysis; and enable the filtered data to be shared with one or more other participants in the list of participants based on the trust profile.

2. The system of claim 1, further comprising metadata associated with the event identifier.

3. The system of claim 2, wherein the one or more computer processors is further configured for providing, to the first participant, the metadata associated with the event identifier.

4. The system of claim 3, wherein the one or more computer processors is further configured for enabling a peer-to-peer connection between a computing device associated with the first participant and a computing device associated with another one of the participants.

5. The system of claim 1, wherein the one or more computer processors is further configured to execute computer-executable instructions for:

receiving a request from the event coordinator for the event identifier for the event;

defining the event identifier; and providing the defined event identifier to the event coordinator.

6. The system of claim 1, wherein the one or more computer processors is further configured for identifying of the first participant from the list of participants as blocked from accessing content data of a second participant.

7. The system of claim 1, wherein the one or more computer processors is further configured for synchronizing, among each of the participants in the list of participants for the event identifier, information about each of the participants.

8. The system of claim 1, wherein the one or more computer processors is further configured for receiving authorization from one of the participants to share the content data associated with the first participant.

9. The system of claim 1, wherein the event identifier comprises one or more of the following: a barcode, a serial number, and a uniform resource locator.

10. The system of claim 1, further comprising a web site for communicating with each of the participants.

11. The system of claim 1, wherein the processor is further configured for generating the event identifier responsive to a request from a user.

12. The system of claim 1, wherein the processor is further configured for maintaining the trust profile.

13. One or more tangible computer storage media having computer-executable instructions stored thereon for enabling the sharing of data content associated with an event, said instructions comprising:

creating a trust profile for each participant in a list of participants;

receiving content data from a first participant of the event, wherein the content data comprises:

a first data including a digital image of an event identifier captured by the first participant, wherein the event identifier is provided by an event coordinator of the event, and a second data including at least one of a digital image, video data, and audio data;

decoding the received content data to detect the event identifier embedded in the digital image of the first data;

analyzing the second data to determine which of the at least one digital image, video data, and audio data to associate with the event identifier; and creating a filtered data based on the analysis; and enabling the filtered data to be shared with one or more other participants in the list of participants based on the trust profile.

14. The computer storage media of claim 13, wherein the instructions further comprise:

storing metadata associated with the event identifier; and providing the stored metadata associated with a particular event identifier to the participants in the list of participants associated with the particular event identifier.

15. The computer readable storage media of claim 14, wherein the metadata comprises one or more of the following: an event name, a date, an event duration, an event location, and the list of participants.

16. The computer readable storage media of claim 13, wherein the instructions further comprise enabling a peer-to-peer connection between a computing device associated with the first participant and a computing device associated with another one of the participants.

17. The computer storage media of claim 13, wherein the event identifier comprises one or more of the following: a barcode, a serial number, and a uniform resource locator.

18. The computer storage media of claim 13, wherein the instructions further comprise synchronizing, among each of the participants in the list of participants for of the event identifier, information about each of the participants.

* * * * *